D. B. LEE.
WIND SHIELD TUBE.
APPLICATION FILED OCT. 5, 1912.
1,082,031.
Patented Dec. 23, 1913.
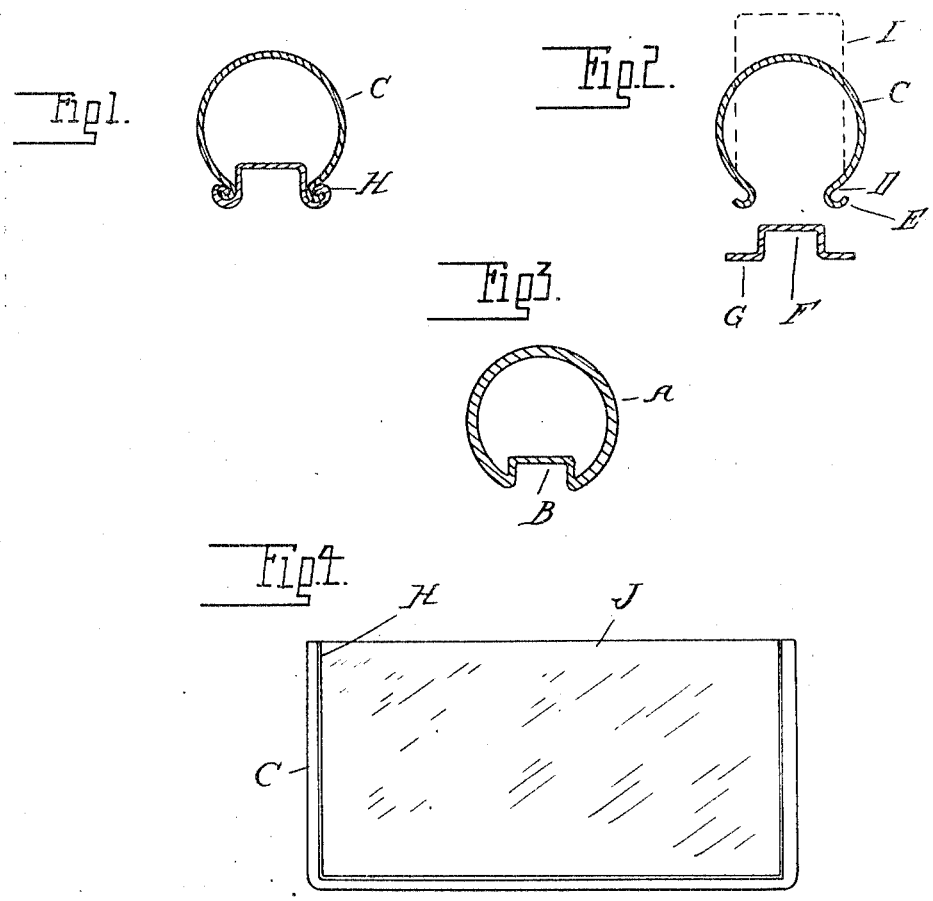

UNITED STATES PATENT OFFICE.

DWIGHT B. LEE, OF DETROIT, MICHIGAN.

WIND-SHIELD TUBE.

1,082,031.  Specification of Letters Patent.  Patented Dec. 23, 1913.

Application filed October 5, 1912. Serial No. 724,130.

*To all whom it may concern:*

Be it known that I, DWIGHT B. LEE, a citizen of the United States of America, residing in the city of Detroit and county of Wayne, State of Michigan, have invented certain new and useful Improvements in Wind-Shield Tubes, of which the following is a specification, reference being had therein to the accompanying drawings.

The invention consists in the construction of a wind-shield tube made of two U-shaped members, one member nested in the other, with marginal flanges at the ends of the members, by which the two are secured together by the formation of interlocking beads, all as more fully hereinafter described and particularly pointed out in the claim.

In the drawings: Figure 1 is a cross-section through a tube embodying my invention; Fig. 2 is a similar section showing the two members detached, before the flanges are rolled into the interlocking bead; Fig. 3 is a cross-section through the tube ordinarily employed in making wind-shield frames; and Fig. 4 is a front elevation of a wind-shield frame of the type known as "clear-vision" frame, with glass therein.

In the present state of the art wind-shields for automobiles are made of an outer frame in which the glass is held, which frames are ordinarily made by taking a piece of seamless tube and shaping it into cross-section (shown at A in Fig. 3), the edges of the glass being adapted to enter the recess B therein. Tubes of this kind are quite expensive and require being made of rather heavy material to stand the strain to which they are subjected.

My invention is designed to build a tube of this kind which can be made at much less cost than the seamless tube construction and which can be made of lighter material, for the reason that I reinforce it with longitudinal stiffening beads. In making up my tube I take a flat piece of sheet metal of the desired gage and roll it into a trough or U-shaped frame, shown at C in Fig. 2, with a downwardly-projecting neck-portion D and lateral flanges E on each side; this forming what, for convenience, I will call the outer member. I also take a strip of flat metal to form a tie-member or tie-strip F and bend it into U-shape, as shown in Fig. 2, with lateral flanges G at each side. I prefer to form this member F so that the U-portion will nicely enter between the neck-portion D of the outer member C and the flanges, so that they will extend beyond the flanges E of the outer member and, by a suitable rolling process, I may bend the flanges G over the flanges E and form the interlocking beads H which will extend longitudinally on each side of the tube and materially strengthen and stiffen it, even if it is made of thinner gage than ordinarily employed in seamless tubes.

Instead of making the tube of circular cross-section as shown in Fig. 1, and in full lines in Fig. 2, I may make it in flat cross-section, such as shown, for instance, at I in dotted lines in Fig. 2. By forming the neck-portion D and the flanges G and E interlocked to form the bead, with the U-shaped portion of the tie-strip F in contact with the neck-portion D, I get a double thickness of metal, plus the beads, along the greater portion of the point where the glass engages the tube, and thus prevent bending or buckling, or other distortions of the tube, and get a much more serviceable structure than can be made from the seamless tubing. This is particularly true when the tube is used to make the "clear vision" wind-shield, as shown in Fig. 4, in which case the glass J is unsupported at its upper edge except by the side members of the frame.

What I claim as my invention is:

A wind shield tube, comprising an arched outer member having the sides of the arch terminating in outwardly extending flanges, a comparatively shallow U-shaped tie strip fitted within the open end of the outer member and having the sides thereof terminating in outwardly extending flanges, said flanges rigidly interlocking with the flanges of the outer member forming beads, the portions of the sides of the outer member adjacent the flanges being rigidly held against the sides of the U-shaped tie strip by said beads, and the latter forming reinforcements arranged adjacent the engaging portions of the sides of the outer member and the tie strip.

In testimony whereof I affix my signature in presence of two witnesses.

DWIGHT B. LEE.

Witnesses:
  JAMES WHITTEMORE,
  JAMES P. BARRY.

Copies of this patent may be obtained for five cents each, by addressing the "Commissioner of Patents, Washington, D. C."